(No Model.)
C. W. LARSON.
COMBINED REGULATING VALVE AND NOZZLE FOR TURBINES.
No. 598,998. Patented Feb. 15, 1898.
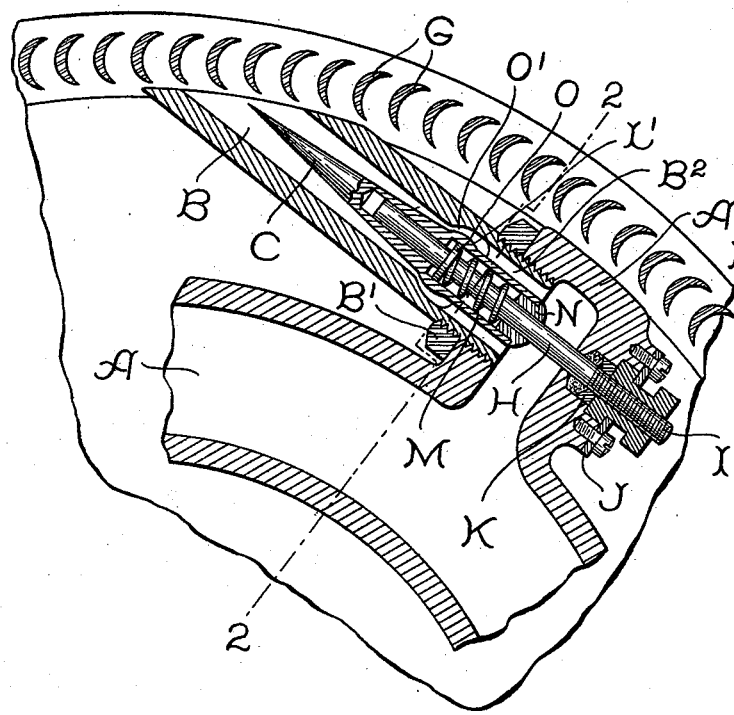
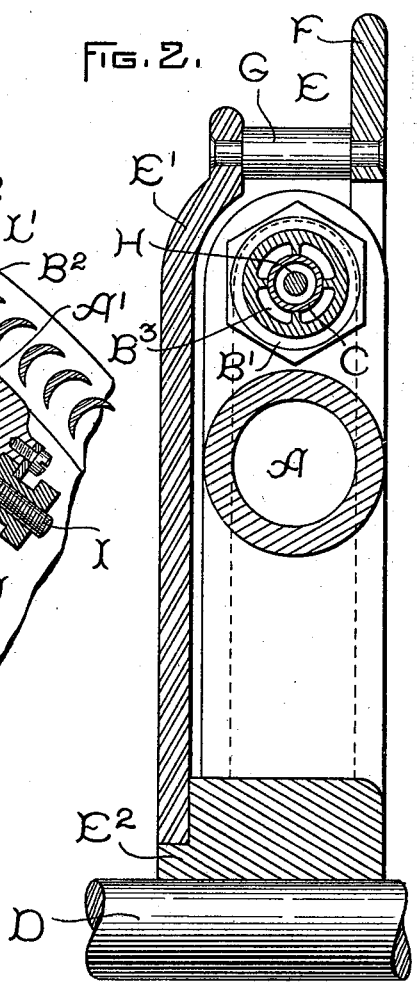
WITNESSES.
A. H. Abell.
G. Haynes.
INVENTOR.
Carl W. Larson,
By Alex F. Macdonald
Atty.

UNITED STATES PATENT OFFICE.

CARL W. LARSON, OF SCHENECTADY, NEW YORK.

COMBINED REGULATING VALVE AND NOZZLE FOR TURBINES.

SPECIFICATION forming part of Letters Patent No. 598,998, dated February 15, 1898.

Application filed June 7, 1897. Serial No. 639,704. (No model.)

*To all whom it may concern:*

Be it known that I, CARL W. LARSON, a subject of the King of Sweden and Norway, residing at Schenectady, county of Schenectady, State of New York, have invented certain new and useful Improvements in a Combined Regulating Valve and Nozzle for Turbines, of which the following is a specification.

The present invention relates to turbines which are actuated by steam, gas, or other elastic fluid-pressure, and has for one of its objects to provide a discharge-nozzle which is so arranged that the elastic fluid can expand therein a certain amount in passing from the source of supply to an element of the turbine.

A further object of the present invention is to provide a balanced regulating-valve which is so arranged that it will automatically vary the amount of fluid-pressure as the work performed by the turbine varies.

It is known that turbines actuated by an elastic fluid operate more efficiently if the fluid is permitted to expand between the point where it enters and leaves the nozzle which directs the fluid against the bucket-wheel. I utilize this fact in my invention; but instead of providing a nozzle with a diverging bore, as heretofore employed to accomplish this result, I employ a nozzle with a straight bore, or even one decreasing in area toward the discharge end, and combine with it a valve which is so arranged that it permits the fluid to expand in passing from the fluid-chamber to the bucket-wheel, at the same time automatically regulating the amount of fluid which passes in accordance with the load on the turbine. The nearer the regulating-valve is to the discharge end of the nozzle the better will be the regulation, and by mounting it within the nozzle I am enabled to obtain the best results.

In the accompanying drawings, attached to and made a part of this specification, Figure 1 is a partial section of a turbine taken through a regulating-valve, and Fig. 2 is a sectional view taken on the line 2 2 of Fig. 1.

The stationary fluid-chamber A is of any desired shape. In the present instance it consists of a hollow ring-shaped casting having one or more radially-extending hollow projections A', in which are mounted nozzle B and regulating-valve C. Mounted on shaft D for rotary movement outside of the fluid-chamber is a bucket-wheel E. This wheel consists of a disk E', which is secured to a hub $E^2$, the latter being mounted on the shaft D, and a ring F. Between said disk and ring are a number of transverse concave-convex pieces G, forming buckets against which the fluid strikes upon leaving nozzle B.

For the purpose of illustration the casing which surrounds the revolving wheel has been omitted, but any suitable casing may be employed. The nozzle B is provided with a straight bore or, if desired, may decrease in area as it approaches the discharge end and is secured to the radial projection A' by a screw-thread. A check-nut B' is employed to retain it in proper position. The nozzle is placed at an angle to the rotating bucket-wheel, and the outer end is beveled in such a manner that a number of the buckets G are always opposite the opening and in position to receive the maximum impact of the fluid-pressure from the chamber A.

Mounted in the right-hand portion of the projection A' is a screw-threaded pin H, provided with an adjusting-nut I, which is secured against lateral movement by a split ring J. To prevent the fluid from escaping around the pin, a gland K is provided having suitable packing. On the left-hand end of the pin within the nozzle is mounted a cylindrical valve C, which tapers as the outer end is approached. This increases the sectional area within the nozzle as the end near the buckets is approached, permitting the elastic fluid from the chamber A to expand before it reaches the buckets. By adjusting the position of the valve in or out the area within the nozzle in which the fluid can expand is changed. By this arrangement the expansion area within the nozzle is increased slightly as the load increases and more fluid passes through the nozzle. The bore in the right-hand end of the valve is somewhat larger than that of the other end to permit the insertion of the balancing-spring M. One end of spring M engages with the piece N, which is secured to the valve, and the other end with collar O, formed on pin H. The tension of spring M is adjusted so that the proper amount of fluid-pressure will be admitted to the nozzle to perform the desired work. The outer periphery of the valve is provided with a spherical enlargement L' and is adapted to vary the opening between the chamber A and the nozzle. The opening in the nozzle at this point is slightly enlarged to permit the insertion of the valve and by slightly rounding the surface O' a fine adjustment of the valve is obtained. To preserve the proper adjustment of the valve and furnish a bearing, ribs $B^2$ are formed on the outer periphery of the valve. Between the ribs are passages $B^3$, which communicate with chamber A and form inlets for nozzle B.

The fluid-pressure in chamber A and the inlet $B^3$ of nozzle B being greater than at the outer end of the nozzle, the pressure tends to close the valve O and cut off the supply of fluid from the bucket-wheel. This is counteracted by means of spring M, which is adjusted so that under normal conditions the pressure tending to open the valve is a little greater than that tending to close it, and the valve remains balanced in this position until one or the other of the forces is changed. When for any reason the speed of the wheel changes, it causes a variation of the fluid-pressure at the outlet or expansion end of the nozzle B. This causes the valve O to open or close, as the case may be, and vary the amount of fluid passing. In this manner the turbine is maintained constant under varying loads.

Having thus described my invention, what I claim as new, and desire to secure by Letters Patent of the United States, is—

1. In a turbine actuated by an elastic-fluid pressure, the combination of a rotating element, a stationary element, one or more nozzles for discharging the fluid in a manner to produce rotation, and a valve mounted in each nozzle for automatically controlling and expanding the passing fluid in accordance with the load on the turbine.

2. In a turbine actuated by an elastic-fluid pressure, the combination of a rotating bucket-wheel, a stationary fluid-chamber, one or more nozzles mounted in such manner as to discharge the fluid against the bucket-wheels, and a balanced valve mounted in each nozzle and having a gradually-decreasing area toward the discharge end of the nozzle for automatically regulating the speed of the turbine.

3. In a turbine operated by elastic-fluid pressure, the combination of a moving element, a nozzle arranged to permit expansion of the fluid between the receiving and discharge ends, and automatic means for varying the expansion of the fluid as the load changes.

4. In a turbine operated by elastic-fluid pressure, the combination of a bucket-wheel, a straight cylindrical nozzle, a fluid-chamber communicating with the nozzle, and an automatic balanced valve between said chamber and the nozzle.

5. In a turbine operated by elastic-fluid pressure, the combination of a straight nozzle for discharging fluid against the bucket-wheel, with an automatic regulating-valve having a decreasing area toward its discharge end, whereby the elastic fluid may expand in passing from the source of supply to the bucket-wheel.

6. In a turbine operated by elastic-fluid pressure, the combination of a revolving bucket-wheel, a stationary straight-bored discharge-nozzle mounted in such manner as to discharge the fluid against the inner periphery of the bucket-wheel, a balanced valve mounted within the nozzle having a decreasing area toward the discharge end of the nozzle so that the fluid can expand before it reaches the bucket-wheel.

7. In a turbine operated by steam or other elastic-fluid pressure, the combination of a revolving bucket-wheel, a stationary straight-bored nozzle, a tapered valve mounted within the nozzle, arranged so that the small end is toward the discharge end of the nozzle, a support for the valve, and a spring acting to open the valve against the fluid-pressure.

8. In a turbine operated by steam or other elastic-fluid pressure, the combination of a rotating bucket-wheel, a stationary fluid-chamber provided with an extension in which is mounted a nozzle, a tapered valve mounted within the nozzle and so arranged that the fluid can expand in passing from the chamber to the discharge end of the nozzle, an adjustable support for the valve, and means situated outside of the nozzle and chamber for adjusting the valve.

9. In a turbine operated by elastic-fluid pressure, the combination of a rotating bucket-wheel, a fluid-pressure chamber, a discharge-nozzle, a tapered valve mounted within the nozzle, a spherical enlargement in the inside of the valve adapted to vary the opening between the fluid-chamber and the nozzle, a spring acting against the pressure of the fluid in the chamber to open the valve, and means for adjusting the valve without disturbing the nozzle or fluid-chamber.

In witness whereof I have hereunto set my hand this 3d day of June, 1897.

CARL W. LARSON.

Witnesses:
B. B. HULL,
A. H. ABELL.